(12) United States Patent
Ramachandran

(10) Patent No.: US 9,001,784 B2
(45) Date of Patent: Apr. 7, 2015

(54) HANDOVER OF MULTIMODE USER EQUIPMENT BETWEEN RADIO ACCESS TECHNOLOGIES FOR REDUCED CALL SETUP TIME

(75) Inventor: Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 756 days.

(21) Appl. No.: 12/878,645

(22) Filed: Sep. 9, 2010

(65) Prior Publication Data

US 2012/0063414 A1 Mar. 15, 2012

(51) Int. Cl.
*H04W 4/00* (2009.01)
*H04W 36/00* (2009.01)
*H04W 36/14* (2009.01)

(52) U.S. Cl.
CPC ...... *H04W 36/0022* (2013.01); *H04W 36/0027* (2013.01); *H04W 36/14* (2013.01)

(58) Field of Classification Search
USPC .............. 370/310.2, 328–337, 342–343, 345; 455/436–444
See application file for complete search history.

(56) References Cited

U.S. PATENT DOCUMENTS 5,943,333 A * 8/1999 Whinnett et al. ............. 370/345
7,065,340 B1 * 6/2006 Einola et al. .................. 455/436
7,359,347 B2 * 4/2008 Ahmavaara et al. .......... 370/328
7,382,750 B2 * 6/2008 Wu ................................ 370/331

(Continued)

FOREIGN PATENT DOCUMENTS

JP 2010068233 A 3/2010

OTHER PUBLICATIONS

3rd Generation Partnership Project; Technical Specification Group Services and System Aspects; Circuit Switched (CS) fallback in Evolved Packet System (EPS); Stage 2 (Release 10), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V10.0.0, Jun. 10, 2010, pp. 1-73, XP050441566, [retrieved on Jun. 10, 2010].

(Continued)

*Primary Examiner* — David Oveissi
(74) *Attorney, Agent, or Firm* — Darren M. Simon

(57) ABSTRACT

A communication system that employs Wireless Wide Area Networks (WWAN) of different Radio Access Technologies (RATs) ensures that simultaneous handover to 1×RTT and 1×EVDO is attempted only when warranted. The User Equipment (UE) that has multiple transceivers and is actively involved in a packet data session can be transferred from LTE to 1×EVDO. A criterion (e.g., cost, subscriber preference, operator preference, or network data traffic) can be used to determine when it is warranted to incur the setup delay time to perform simultaneous handover of both a voice connection and a packet data session. Conversely, if there is no active data session, generally the UE can be handed over only to 1×RTT for the voice/Short Message Service (SMS) call. In an aspect, the criterion can still dictate setting up simultaneously even for an active packet data session, such as for maintaining a time critical function of the device.

37 Claims, 11 Drawing Sheets

(56) References Cited

U.S. PATENT DOCUMENTS

| | | | |
|---|---|---|---|
| 8,244,251 B1* | 8/2012 | Bestermann et al. | 455/436 |
| 2003/0169725 A1* | 9/2003 | Ahmavaara et al. | 370/352 |
| 2005/0271011 A1* | 12/2005 | Alemany et al. | 370/331 |
| 2006/0239229 A1 | 10/2006 | Marinescu et al. | |
| 2006/0268848 A1* | 11/2006 | Larsson et al. | 370/356 |
| 2006/0281459 A1* | 12/2006 | Marinescu et al. | 455/436 |
| 2007/0177559 A1* | 8/2007 | Jain et al. | 370/338 |
| 2007/0232312 A1* | 10/2007 | Gallagher et al. | 455/436 |
| 2008/0064401 A1* | 3/2008 | Forssell et al. | 455/436 |
| 2008/0254797 A1* | 10/2008 | Achtari et al. | 455/436 |
| 2008/0311913 A1* | 12/2008 | Thiebaut et al. | 455/436 |
| 2009/0111468 A1* | 4/2009 | Burgess et al. | 455/436 |
| 2010/0061337 A1* | 3/2010 | Hallenstal et al. | 370/331 |
| 2010/0260147 A1* | 10/2010 | Xing et al. | 370/332 |
| 2010/0304749 A1* | 12/2010 | Dwyer et al. | 455/443 |
| 2011/0176511 A1* | 7/2011 | Sayeedi | 370/331 |
| 2011/0183671 A1* | 7/2011 | Lee et al. | 455/436 |
| 2012/0040673 A1* | 2/2012 | Ying et al. | 455/436 |

OTHER PUBLICATIONS

International Search Report and Written Opinion—PCT/US2011/051111—ISA/EPO—Oct. 31, 2011.

Nokia Siemens Networks et al: "1xRTT CSFB with PS handover", 3GPP Draft; S2-093531_1XCSFB With PS HO—Disc.Final, 3rd Generation Partnership Project (3GPP), Mobile Competence Centre ; 650, Route Des Lucioles ; F-06921 Sophia-Antipolis Cedex ; France, No. Tallinn; May 5, 2009, XP050346596, [retrieved on May 5, 2009] the whole document.

Nokia Siemens Networks et al: "Enhanced CS fallback to 1xRTT with PS Handover", 3GPP Draft; S2-094550 Enhanced 1XCSFB-Draft—V05A, 3rd Generation Partnership Project (3GPP), Mobile Competence Centre ; 650, Routes Des Lucioles; F-06921 Sophia-Antipolis Cedex ; France, No. Sophia; Jun. 30, 2009, XP050356039, [retrieved on Jun. 30, 2009] p. 16, chapter "B.2.3a.6 Interaction between enhanced CS Fallback to 1xRTT and optimized PS handover".

* cited by examiner

APPARATUS 802

MEANS FOR RECEIVING SERVICE FROM AN ACCESS NODE AT A UE USING A RAT FOR SIMULTANEOUS VOICE CONNECTION AND A PACKET DATA SESSION  804

MEANS FOR REPORTING A MEASUREMENT TO THE ACCESS NODE THAT INDICATES THAT A HANDOFF IS WARRANTED TO A COVERAGE AREA SERVED BY A VOICE-CAPABLE RAT AND A SEPARATE PACKET DATA-CAPABLE RAT  806

MEANS FOR REQUESTING A SIMULTANEOUS HANDOFF BY THE ACCESS NODE OF THE UE TO THE FIRST NODE FOR A VOICE CONNECTION AND TO THE SECOND NODE FOR A PACKET DATA SESSION IN RESPONSE TO DETERMINING THAT THE UE SATISFIES A CRITERION  808

MEANS FOR REQUESTING A HANDOFF BY THE ACCESS NODE OF THE UE TO A SELECTED ONE OF FIRST NODE AND SECOND NODE IN RESPONSE TO DETERMINING THAT THE UE DOES NOT SATISFY THE CRITERION  810

*FIG. 8*

HANDOVER OF MULTIMODE USER EQUIPMENT BETWEEN RADIO ACCESS TECHNOLOGIES FOR REDUCED CALL SETUP TIME

BACKGROUND

1. Field

The present disclosure relates to a mobile operating environment, and more particularly, to selectively maintaining data packet session continuity when changing coverage areas for voice sessions that use different radio access technologies.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1X, CDMA2000 EV-DO Rev. 0, CDMA2000 EV-DO Rev. A, and CDMA2000 EV-DO Rev. B. All are approved radio interfaces for the ITU's IMT-2000. CDMA2000 has a relatively long technical history and is backward-compatible with its previous 2G iteration IS-95 (cdmaOne).

CDMA2000 1X (IS-2000), also known as 1× and 1×RTT, is the core CDMA2000 wireless air interface standard. The designation "1×", meaning 1 times Radio Transmission Technology, indicates the same RF bandwidth as IS-95: a duplex pair of 1.25 MHz radio channels. 1×RTT almost doubles the capacity of IS-95 by adding 64 more traffic channels to the forward link, orthogonal to (in quadrature with) the original set of 64. The 1X standard supports packet data speeds of up to 153 kbps with real world data transmission averaging 60-100 kbps in most commercial applications. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1XEV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by 3rd Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the 3rd Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Dual mode (or multimode) mobiles refer to mobile phones that are compatible with more than one form of data transmission or network, as contrasted with single-mode mobiles. For instance, a dual-mode phone can be a telephone which uses more than one technique for sending and receiving voice and data. This could be for wireless mobile phones or for wired phones.

In one aspect, the dual mode can refer to network compatibility, such as mobile phones containing two types of cellular radios for voice and data. These phones include combination of GSM and CDMA technology. They can be used as a GSM or CDMA phone according to user preference. These handsets are also called global phones and are essentially two phones in one device. For this particular example of a dual mode cdma2000 and GSM phone, there are two possibilities, either two cards (R-UIM and SIM) or one card (SIM-only) where the R-UIM information is stored in the Mobile Equipment (handset shell).

Another kind of dual mode or multimode mobiles can refer to User Equipment (UEs) that have more than one receiver, more than one transmitter, or more than one transceiver enabling simultaneous operations in two different modes. For example, voice and data sessions can be performed separately and simultaneously. Alternatively, a secondary transceiver can be used to acquire new service or maintain continuity of a current session while using a primary transceiver.

Situations can arise wherein a multimode UE receives service from a Radio Access Network (RAN) that uses a Radio Access Technology (RAT) that can support both a voice session and a data session. In moving to a coverage area of a different RAN, acquiring and establishing connections on two different RATs can be required in order to continue the voice and data session, each imposing differing amounts of delays for achieving a simultaneous handoff without losing session continuity. Lengthy delays can significantly degrade user equipment and Quality of Service (QoS).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for performing a handoff of a User Equipment (UE). An access node serves a UE. The access node determines that a handoff is warranted when the UE is in a first coverage area of a first node that provides a voice call RAT and in a second coverage area of a second node that provides data call RAT. The access node performs a simultaneous handoff of the UE to the first node for a voice connection and to the second node for a packet data session in response to determining that the UE satisfies a criterion and otherwise performs a handoff of the UE to a selected one of the first node or the second node in response to determining that the UE does not satisfy the criterion.

In another aspect, at least one processor is provided for performing a handoff of a UE. A first module serves a UE via an access node. A second module determines that a handoff is warranted when the UE is in a first coverage area of a first node that provides a voice call RAT and in a second coverage area of a second node that provides data call RAT. A third module performs a simultaneous handoff of the UE to the first node for a voice connection and to the second node for a packet data session in response to determining that the UE satisfies a criterion. A fourth module performs a handoff of the UE to a selected one of the first node or the second node in response to determining that the UE does not satisfy the criterion.

In an additional aspect, a computer program product is provided for performing a handoff of a UE. A non-transitory computer-readable medium stores sets of code. A first set of codes causes a computer to serve a UE via an access node. A second set of codes causes the computer to determine that a handoff is warranted when the UE is in a first coverage area of a first node that provides a voice call RAT and in a second coverage area of a second node that provides data call RAT. A third set of codes causes the computer to perform a simultaneous handoff of the UE to the first node for a voice connection and to the second node for a packet data session in response to determining that the UE satisfies a criterion. A fourth set of codes causes the computer to perform a handoff of the UE to a selected one of the first node or the second node in response to determining that the UE does not satisfy the criterion.

In another additional aspect, an apparatus is provided for performing a handoff of a UE. The apparatus comprises means for serving a UE via an access node. The apparatus comprises means for determining that a handoff is warranted when the UE is in a first coverage area of a first node that provides a voice call RAT and in a second coverage area of a second node that provides data call RAT. The apparatus comprises means for performing a simultaneous handoff of the UE to the first node for a voice connection and to the second node for a packet data session in response to determining that the UE satisfies a criterion. The apparatus comprises means for performing a handoff of the UE to a selected one of the first node or the second node in response to determining that the UE does not satisfy the criterion.

In a further aspect, an apparatus is provided for performing a handoff of a UE, comprising a transceiver that serves a UE via an access node. A computing platform determines that a handoff is warranted when the UE is in a first coverage area of a first node that provides a voice call RAT and in a second coverage area of a second node that provides data call RAT. A network interface performs a simultaneous handoff of the UE to the first node for a voice connection and to the second node for a packet data session in response to determining that the UE satisfies a criterion. The network interface further performs a handoff of the UE to a selected one of the first node or the second node in response to determining that the UE does not satisfy the criterion.

In yet another aspect, a method is provided for performing a handoff of a UE. A UE receives service from an access node. The UE determines that a handoff is warranted when the UE is in a first coverage area of a first node that provides a voice call RAT and in a second coverage area of a second node that provides data call RAT. The UE requests a simultaneous handoff by the access node of the UE to the first node for a voice connection and to the second node for a packet data session in response to determining that the UE satisfies a criterion. The UE requests a handoff by the access node of the UE to a selected one of the first node or the second node in response to determining that the UE does not satisfy the criterion.

In yet an additional aspect, at least one processor is provided for performing a handoff of a UE. A first module receives service by an access node. A second module determines that a handoff is warranted when the UE is in a first coverage area of a first node that provides a voice call RAT and in a second coverage area of a second node that provides data call RAT. A third module requests a simultaneous handoff by the access node of the UE to the first node for a voice connection and to the second node for a packet data session in response to determining that the UE satisfies a criterion. A fourth module requests a handoff by the access node of the UE to a selected one of the first node or the second node in response to determining that the UE does not satisfy the criterion.

In yet a further aspect, a computer program product is provided for performing a handoff of a UE. A non-transitory computer-readable medium stores sets of codes. A first set of codes causes a computer to receive service from an access node. A second set of codes causes the computer to determine that a handoff is warranted when the UE is in a first coverage area of a first node that provides a voice call RAT and in a second coverage area of a second node that provides data call RAT. A third set of codes causes the computer to request a simultaneous handoff by the access node of the UE to the first node for a voice connection and to the second node for a packet data session in response to determining that the UE satisfies a criterion. A fourth set of codes causes the computer to request a handoff by the access node of the UE to a selected one of the first node or the second node in response to determining that the UE does not satisfy the criterion.

In another aspect, an apparatus is provided for performing a handoff of a UE. The apparatus comprises means for receiving service from an access node at a UE. The apparatus comprises means for determining that a handoff is warranted when the UE is in a first coverage area of a first node that provides a voice call RAT and in a second coverage area of a second node that provides data call RAT. The apparatus comprises means for requesting a simultaneous handoff by the access node of the UE to the first node for a voice connection and to the second node for a packet data session in response to determining that the UE satisfies a criterion. The apparatus comprises means for requesting a handoff by the access node of the UE to a selected one of the first node or the second node in response to determining that the UE does not satisfy the criterion.

In yet another aspect, an apparatus is provided for performing a handoff of a UE. A transceiver, at a UE, receives service from an access node. A computing platform determines that a handoff is warranted when the UE is in a first coverage area of a first node that provides a voice call RAT and in a second coverage area of a second node that provides data call RAT. The transceiver further requests a simultaneous handoff by the access node of the UE to the first node for a voice connection and to the second node for a packet data session in response to determining that the UE satisfies a criterion. The transceiver further requests a handoff by the access node of the UE to a selected one of the first node or the second node in response to determining that the UE does not satisfy the criterion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 illustrates a schematic diagram of an apparatus having means for performing a handoff of a UE.

DETAILED DESCRIPTION

Figure 1:
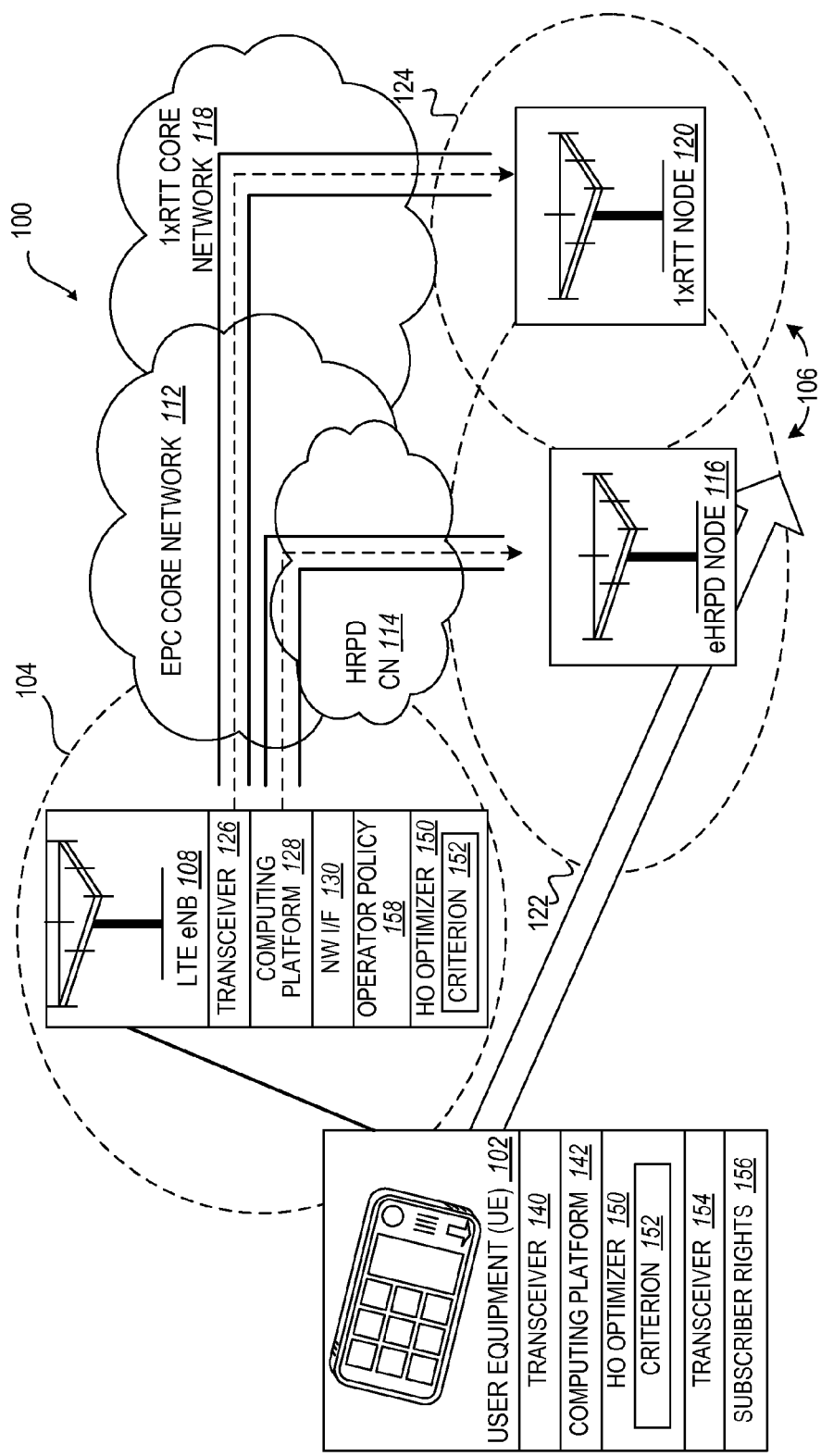
FIG. 1 illustrates a schematic diagram of a wireless communication system that supports handoff of a multimode User Equipment (UE).

Many 3GPP2 operators are deploying 3GPP Long Term Evolution (LTE) moving forward. Initial deployment is expected to have islands of LTE coverage with more universal evolved High Rate Packet Data (eHRPD) coverage. Hence, a mobile User Equipment (UE) camped on LTE could run out of LTE coverage and be forced to move to eHRPD for continuing its service. In order to provide a good user experience there needs to be minimal service discontinuity while moving from LTE to eHRPD.

The present innovation pertains to the operation of multi-mode mobile phones or User Equipment (UEs) in a LTE network. Multimode mobile phones are capable of communicating over 3GPP air interface technologies such as E-UTRAN (aka LTE), UTRAN, GERAN (GSM/Edge Radio Access Network) and 3GPP2 air interface technologies such as 1xRTT and 1xEVDO. It is anticipated that the multimode UE, while generally camping on the LTE network for packet data services (i.e., Evolved Packet Services System (EPS) services) will also have to camp/register on the circuit-switched (CS) core network of either a 3GPP or 3GPP2 network for certain essential services such as Voice and Short Message Service (SMS). After having camped on LTE and after having registered with a circuit switched core network, the UE may be moved to a CS Radio Access Network (RAN) such as GSM, UMTS or 1xRTT for performing voice or SMS communication.

While the UE is camped on LTE, it may be involved in a packet data session. If this UE at any given time is capable of communication over only one radio, the desire to make a voice call over a CS radio access network will unfortunately mean suspension of the packet data session over LTE, prior to being switched to a CS RAN. The packet data session may be resumed after the UE has completed the voice call and has returned/switched to camp on LTE.

A UE that is capable of simultaneously communicating on two radio access technologies can avail the benefits of simultaneous voice and data communication. For instance such a UE can perform voice communication over 1xRTT and data communication over 1xEVDO simultaneously.

A challenge exists for a UE that is capable of simultaneously communicating over 1xRTT and 1xEVDO when simultaneously handed off from LTE to both a 1xRTT target cell and a 1xEVDO target cell. In this way the UE that was camped on LTE can be moved to 1xRTT when a voice call is to be made, while simultaneously moving any packet data call from LTE to 1xEVDO so that the data session may be continued. However, doing so requires coordination between the LTE network, the 1xRTT network and the 1xEVDO network in order to make resource reservation and traffic channel assignment at the two target networks (1xRTT and 1xEVDO). This procedure can be time consuming.

Further, the LTE evolved Base Node (eNB) must request the UE to measure both 1xRTT and 1xEVDO neighbors prior to attempting a simultaneous handoff. This also adds to additional delay since the UE has to perform measurement for two RATs on two or more bands/channels. Essentially, attempting to perform simultaneous handover is a delay intensive process that significantly degrades the call setup time for the desired voice call. This delay must be minimized whenever possible.

The network and the UE, either singularly or in collaboration, can ensure that simultaneous handover to 1xRTT and 1xEVDO is attempted only when warranted. For example, the UE is actively involved in a packet data session and there is a need to transfer the packet data session from LTE to 1xEVDO. However, there can be considerations that warrant not transferring the packet data session even if active, such as an exorbitant subscriber cost, subscriber preference, operator preference, or network burden in doing so.

Conversely, if there is no active data session, generally the UE can be handed over only to 1xRTT (for the voice/SMS call) and any procedural delays associated with simultaneous handover to 1xEVDO can be eliminated in order to speed up the setup of the voice call. However, there can be considerations that do warrant transferring the packet data session even if not currently active, such as maintaining a time critical function of the device that is dependent upon accessing the data session.

Various aspects of the disclosure are further described below. It should be apparent that the teaching herein can be embodied in a wide variety of forms and that any specific structure or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented or a method practiced using any number of the aspects set forth herein. In addition, an apparatus can be implemented or a method practiced using other structure or functionality in addition to or other than one or more of the aspects set forth herein. As an example, many of the methods, devices, systems, and apparatuses described herein are described in the context of providing dynamic queries and recommendations in a mobile communication environment. One skilled in the art should appreciate that similar techniques could apply to other communication and non-communication environments as well.

As used in this disclosure, the term "content" and "objects" are used to describe any type of application, multimedia file, image file, executable, program, web page, script, document, presentation, message, data, meta-data, or any other type of media or information that may be rendered, processed, or executed on a device.

As used in this disclosure, the terms "component," "system," "module," and the like are intended to refer to a computer-related entity, either hardware, software, software in execution, firmware, middle ware, microcode, or any combination thereof. For example, a component can be, but is not limited to being, a process running on a processor, a processor, an object, an executable, a thread of execution, a program, or a computer. One or more components can reside within a process or thread of execution and a component can be localized on one computer or distributed between two or more computers. Further, these components can execute from various computer readable media having various data structures stored thereon. The components can communicate by way of local or remote processes such as in accordance with a signal having one or more data packets (e.g., data from one component interacting with another component in a local system, distributed system, or across a network such as the Internet with other systems by way of the signal). Additionally, components of systems described herein can be rearranged or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the operations or actions described herein.

Moreover, various aspects or features described herein can be implemented as a method, apparatus, or article of manufacture using standard programming or engineering techniques. Further, the operations or actions of a method or algorithm described in connection with the aspects disclosed herein can be embodied directly in hardware, in a software module executed by a processor, or in a combination of the two. Additionally, in some aspects, the operations or actions of a method or algorithm can reside as at least one or any combination or set of codes or instructions on a machine-readable medium or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction, or data.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or deducing states of a system, environment, or user from a set of observations as captured via events or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events or data. Such inference results in the construction of new events or actions from a set of observed events or stored event data, whether or not the events are correlated in close temporal proximity, and whether the events and data come from one or several event and data sources.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects With initial reference to FIG. 1, a wireless communication system 100 significantly reduces call setup time delay or provides other benefits for a UE 102 moving from a source Wireless Wide Area Network (WWAN) coverage area 104 to a target WWAN coverage area 106 that warrants a handoff.

An apparatus such as an access node, depicted as an evolved Base Node (eNB) 108, performs a handoff of the UE 102. In an exemplary aspect, the eNB 108 uses an advanced Radio Access Technology (RAT) such as LTE. In response to a mobile-originated or mobile terminated voice call, a determination is made that handoff (HO) for either or both of a voice call and a data connection are to be set up simultaneously or sequentially at the second coverage area or areas 106 by the LTE eNB 108. In the illustrative depiction, LTE eNB 108 communicates as depicted at 111 via an Evolved Packet Core (EPC) core network 112 and an HRPD (High Rate Packet Data) core network 114 to a first node 116 that uses a data connection-capable RAT (e.g., eHRPD). LTE eNB 108 also communicates as depicted at 117 via a part of the EPC core network 112 and a 1×RTT core network 118 to a second node 120 that uses a voice call-capable RAT (e.g., 1×RTT). The first and second nodes 116, 120 can be co-located, each supporting the second WWAN coverage area 106. Alternatively, the first and second nodes 116, 120 have separate coverage areas 122, 124 respectively.

In one aspect, a transceiver 126 of the eNB 108 serves the UE 102. A computing platform 128 of the eNB 108 determines that a handoff is warranted for the UE 102 that is in the first coverage area 122 of the first node 116 that provides a voice call RAT and in the second coverage area 124 of the second node 120 that provides data call RAT. A network interface (NW I/F) 130 performs a simultaneous handoff of the UE 102 to the first node 116 for a voice connection and to the second node 120 for a packet data session in response to determining that the UE 102 satisfies a criterion. The network interface 130 further performs a handoff of the UE 102 to a selected one of first node 116 and second node 120 in response to determining that the UE 102 does not satisfy the criterion.

Alternatively in another aspect, a transceiver 140 of the UE 102 is served by access node (e.g., LTE eNB 108). A computing platform 142 of the UE 102 determines that a handoff is warranted for the UE 102 that is in the first coverage area 122 of the first node 116 that provides a voice call RAT and in the second coverage area 124 of a second node 120 that provides data call RAT. The transceiver further requests a simultaneous handoff by the LTE eNB 108 of the UE 102 to the first node 116 for a voice connection and to the second node 120 for a packet data session in response to determining that the UE 102 satisfies a criterion. The transceiver further requests a handoff by the access node of the UE 102 to a selected one of first node 116 and second node 120 in response to determining that the UE 102 does not satisfy the criterion.

Thus, either or both of the UE 102 and LTE eNB 108 include a handoff optimization component 150 that evaluate a criterion or criteria 152 in order to decide whether or not to do a simultaneous handoff to two base nodes 116, 120 that use different RATs.

In additional aspects, the criterion 152 can be associated with one or more conditions. As a first example, the criterion 152 can be associated with whether the UE 102 has a second receiver, transmitter or transceiver 154 for enabling simultaneous handoffs. As a second example, the criterion 152 can be related to an extent of subscriber rights 156 attributed to the UE 102. In a third example, the criterion 152 can be related to an operator policy 158. In a fourth example, the criterion 152 can be related to an amount of network data traffic. For example, the status of data packet carrying queues, status of application handles (i.e., whether or not applications are running), the human user's preferences, the operator's preferences etc. can individually or in various combinations can be used to produce the criterion or criteria.

It should be appreciated with the benefit of the present disclosure that the determination of the need to perform simultaneous voice and data handoff may be executed by the network as well as the UE. Thus, the network can look at the criteria and decide to do simultaneous Handoff (HO). Alternatively, the UE can look at the criteria and decide to request for simultaneous HO. This whole procedure of simultaneous handoff and the determination in an exemplary aspect is executed when the user initiates or receives a voice call.

Criteria for ongoing data communication can be realized by means of checking data passing through the various data communication queues or by checking if data communication applications are up and running.

Figure 2:
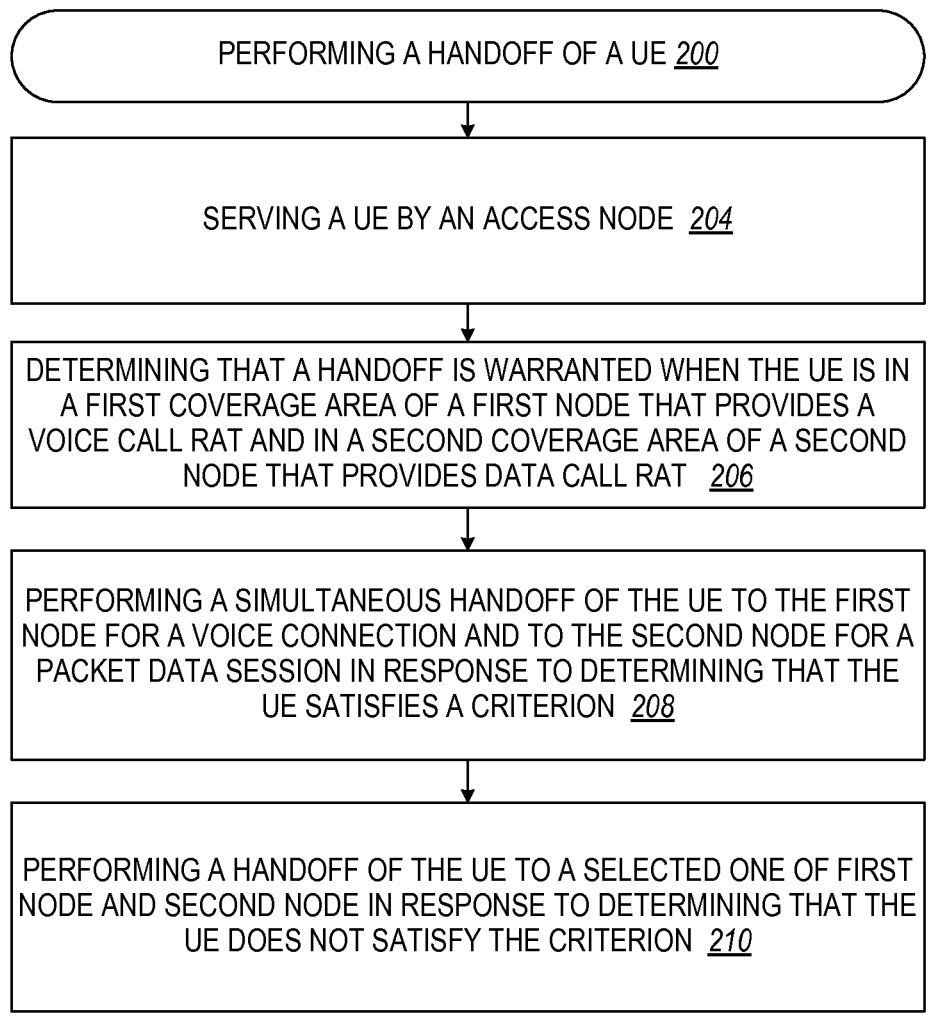
FIG. 2 illustrates a flow diagram for a methodology for maintaining session continuity in a packet data network.

In FIG. 2, a methodology or sequence of operations 200 that is performed by an advanced access node is depicted for performing a handoff of a UE. The advanced access node serves a UE (block 204). The advanced access node determines that a handoff is warranted when the UE is in a first coverage area of a first node that provides a voice call RAT and in a second coverage area of a second node that provides data call RAT (block 206). The advanced access node performs a simultaneous handoff of the UE to the first node for a voice connection and to the second node for a packet data session in response to determining that the UE satisfies a criterion (block 208). The advanced access node performs a handoff of the UE to a selected one of the first node or the second node in response to determining that the UE does not satisfy the criterion (block 210).

Figure 3:
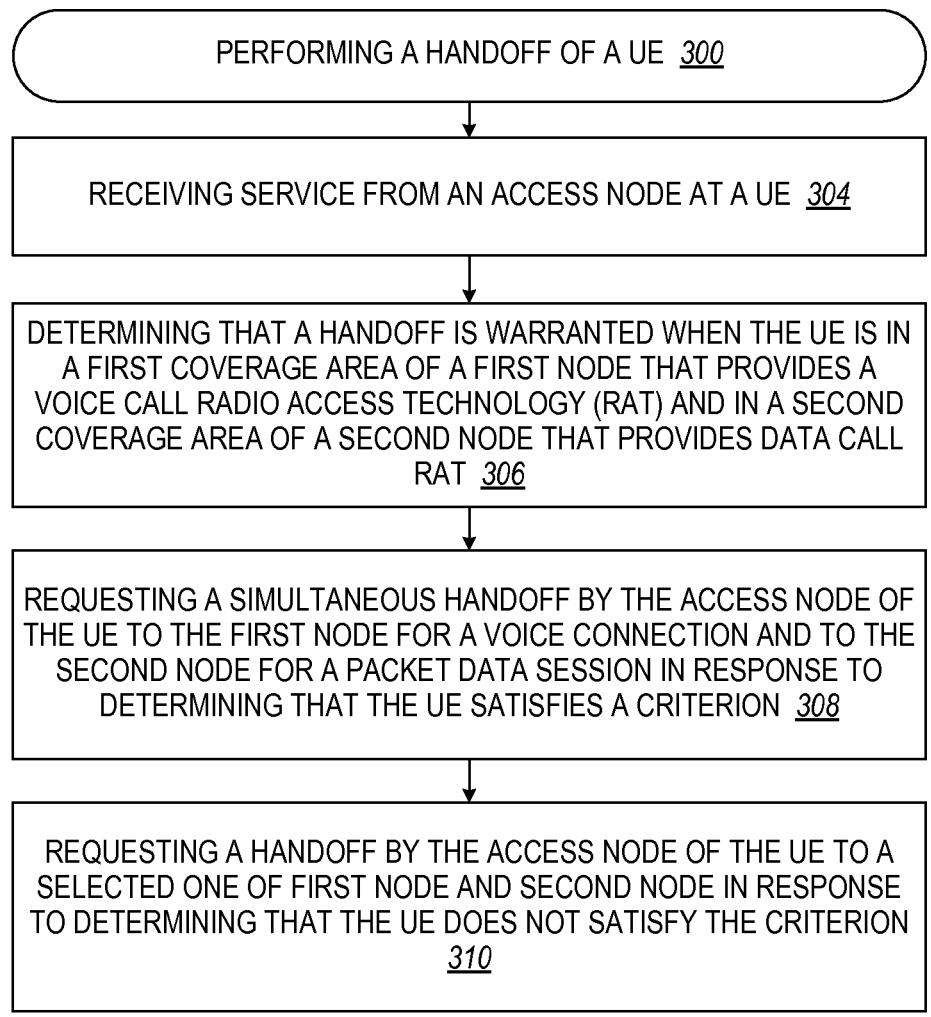
FIG. 3 illustrates a flow diagram for a methodology for maintaining session continuity in a packet data network.

In FIG. 3, a methodology or sequence of operations 300 that is performed by a multimode UE is depicted for performing a handoff. The multimode UE receives service from an access node (block 304). The multimode UE determines that a handoff is warranted when the UE is in a first coverage area of a first node that provides a voice call Radio Access Technology (RAT) and in a second coverage area of a second node that provides data call RAT (block 306). The multimode UE requests a simultaneous handoff by the access node of the UE to the first node for a voice connection and to the second node for a packet data session in response to determining that the UE satisfies a criterion (block 308). The multimode UE requests a handoff by the access node of the UE to a selected one of the first node or the second node in response to determining that the UE does not satisfy the criterion (block 310).

In one exemplary aspect, an eNB using an advanced RAT such as LTE determines if the UE is involved in user data communication. If the UE is not involved in data communication, the eNB eliminates procedures required to perform a simultaneous handover to 1×EVDO. The LTE eNB is aware of the UE's capability, in that the UE can perform simultaneous handoff from LTE to 1×RTT and 1×EVDO RATs. The LTE eNB is also able to determine that the UE is not sending or receiving any data traffic over the DRBs.

The eNB can deduce this in multiple ways: (1) The LTE eNB is aware of the fact that the UE transitioned from RRC_IDLE to RRC_CONNECTED for the purpose of voice communication over a Circuit Switched (CS) RAT. (RRC refers to Radio Resource Control.) Therefore the UE was not involved in data communication already. (2) The LTE eNB already monitors the status of the data radio bearers (DRBs) and is aware of their presence and usage.

Based on this information, if the LTE eNB determines that the UE does not have any ongoing packet data communication, the LTE eNB should schedule connected mode measurements only for 1×RTT neighbors. The eNB should only trigger Handoff from LTE to 1×RTT and should trigger blind redirection to 1×EVDO.

If in fact the LTE eNB determines that the UE has ongoing packet data communications, the LTE eNB should schedule connected mode measurements for both 1×RTT and 1×EVDO neighbors. The eNB should trigger Handoff from LTE to 1×RTT and 1×EVDO.

Figure 4:
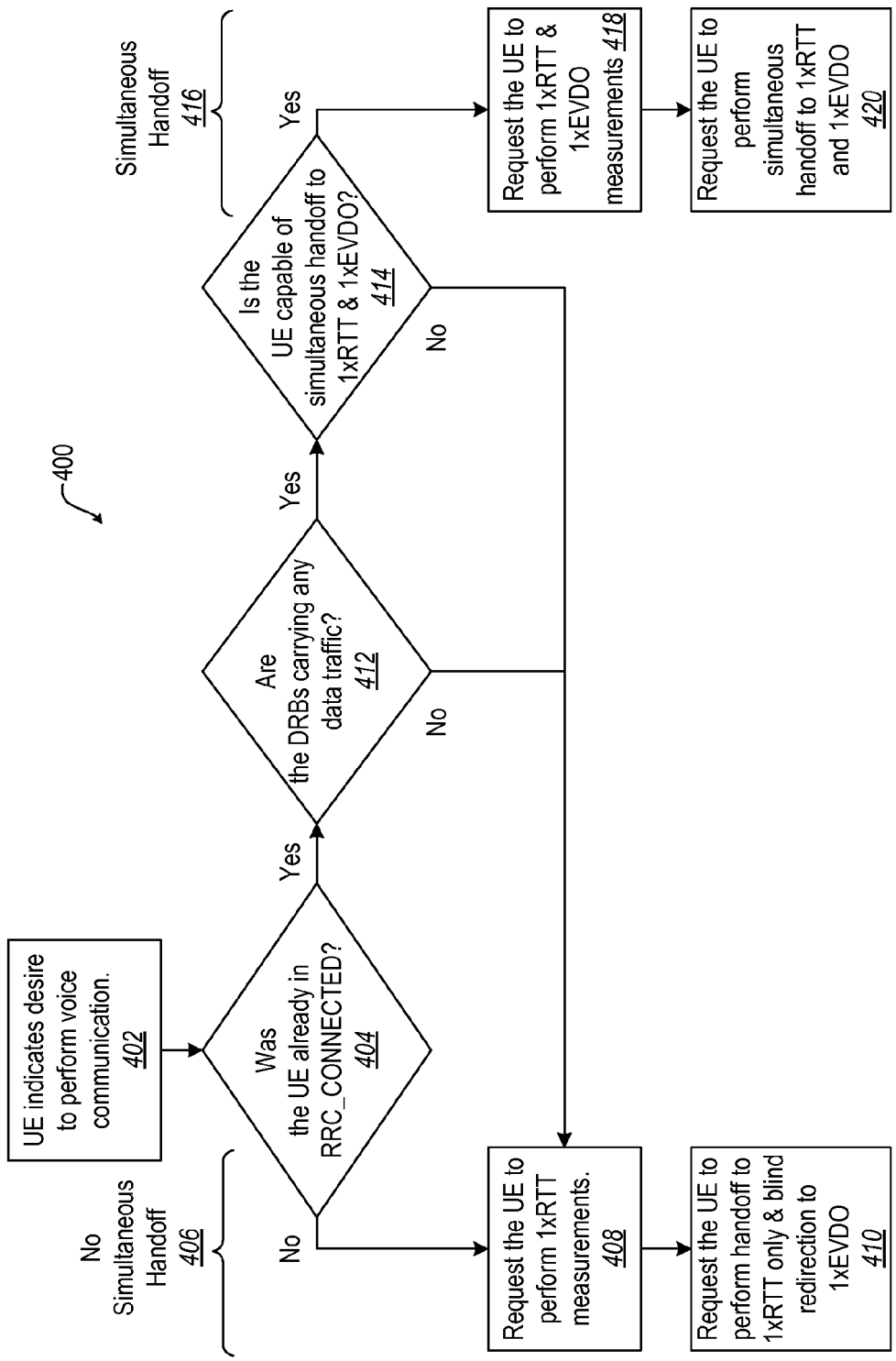
FIG. 4 illustrates a flow diagram for an exemplary logic employed by an evolved Base Node (eNB) to determine the handling of the UE's desire to make a voice call.

In FIG. 4, an exemplary methodology 400 depicts logic employed by the eNB to determine the handling of the UE's desire to make a voice call. The LTE eNB receives an indication from the UE of a desire to perform voice communication (block 402). A determination is made whether the UE is already in RRC_connected (block 404). If not, than simultaneous handoff is not warranted as depicted at 406. Thus, the LTE eNB requests that the UE perform 1×RTT measurements (block 408). The LTE eNB also requests that the UE perform handoff to 1×RTT only and to perform blind redirection to 1×EVDO (block 410).

If RRC_CONNECTED at block 404, then a further determination is made as to whether the DRBs are carrying any data traffic (block 412). If not, simultaneous handoff is not warranted as depicted at 406 and processing proceeds to block 408. Otherwise, an additional determination is made as to whether the UE is capable of simultaneous handoff to 1×RTT and 1×EVDO (block 414). If not, simultaneous handoff is not warranted as depicted at 406 and processing proceeds to block 408. Otherwise, criteria are satisfied for simultaneous handoff as depicted at 416. Thus, the LTE eNB requests that the UE to perform 1×RTT and 1×EVDO measurements (block 418). The LTE eNB requests that the UE to perform simultaneous handoff to 1×RTT and 1×EVDO (block 420).

By virtue of the going, a system and method is provided for the reduction of voice call setup time when the eNB determines the status of a UE's packet data communication and performs packet data handoff related procedures only when the UE is determined to have ongoing packet data communications.

Figure 5:
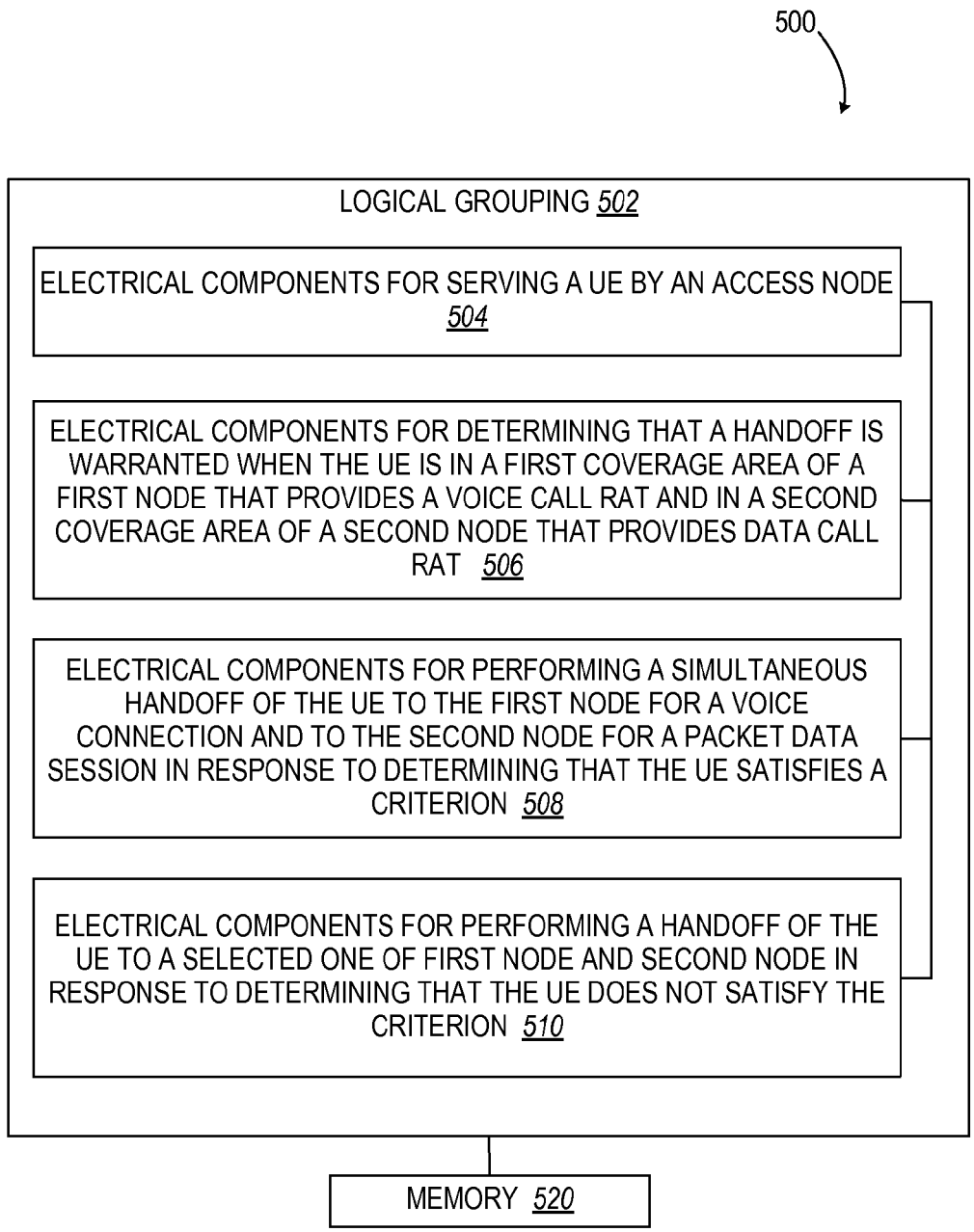
FIG. 5 illustrates a schematic diagram of a system for performing a handoff of a UE.

With reference to FIG. 5, illustrated is a system 500 for performing a handoff of a UE. For example, system 500 can reside at least partially within user equipment (UE). It is to be appreciated that system 500 is represented as including functional blocks, which can be functional blocks that represent functions implemented by a computing platform, processor, software, or combination thereof (e.g., firmware). System 500 includes a logical grouping 502 of electrical components that can act in conjunction. For instance, logical grouping 502 can include an electrical component 504 for receiving service from an access node. Moreover, logical grouping 502 can include an electrical component 506 for determining that a handoff is warranted when the UE is in a first coverage area of a first node that provides a voice call RAT and in a second coverage area of a second node that provides data call RAT. For another instance, logical grouping 502 can include an electrical component 508 for performing a simultaneous handoff of the UE to the first node for a voice connection and to the second node for a packet data session in response to determining that the UE satisfies a criterion. For an additional instance, logical grouping 502 can include an electrical component 510 for performing a handoff of the UE to a selected one of the first node or the second node in response to determining that the UE does not satisfy the criterion. Additionally, system 500 can include a memory 520 that retains instructions for executing functions associated with electrical components 504-510. While shown as being external to memory 520, it is to be understood that one or more of electrical components 504-510 can exist within memory 520.

Figure 6:
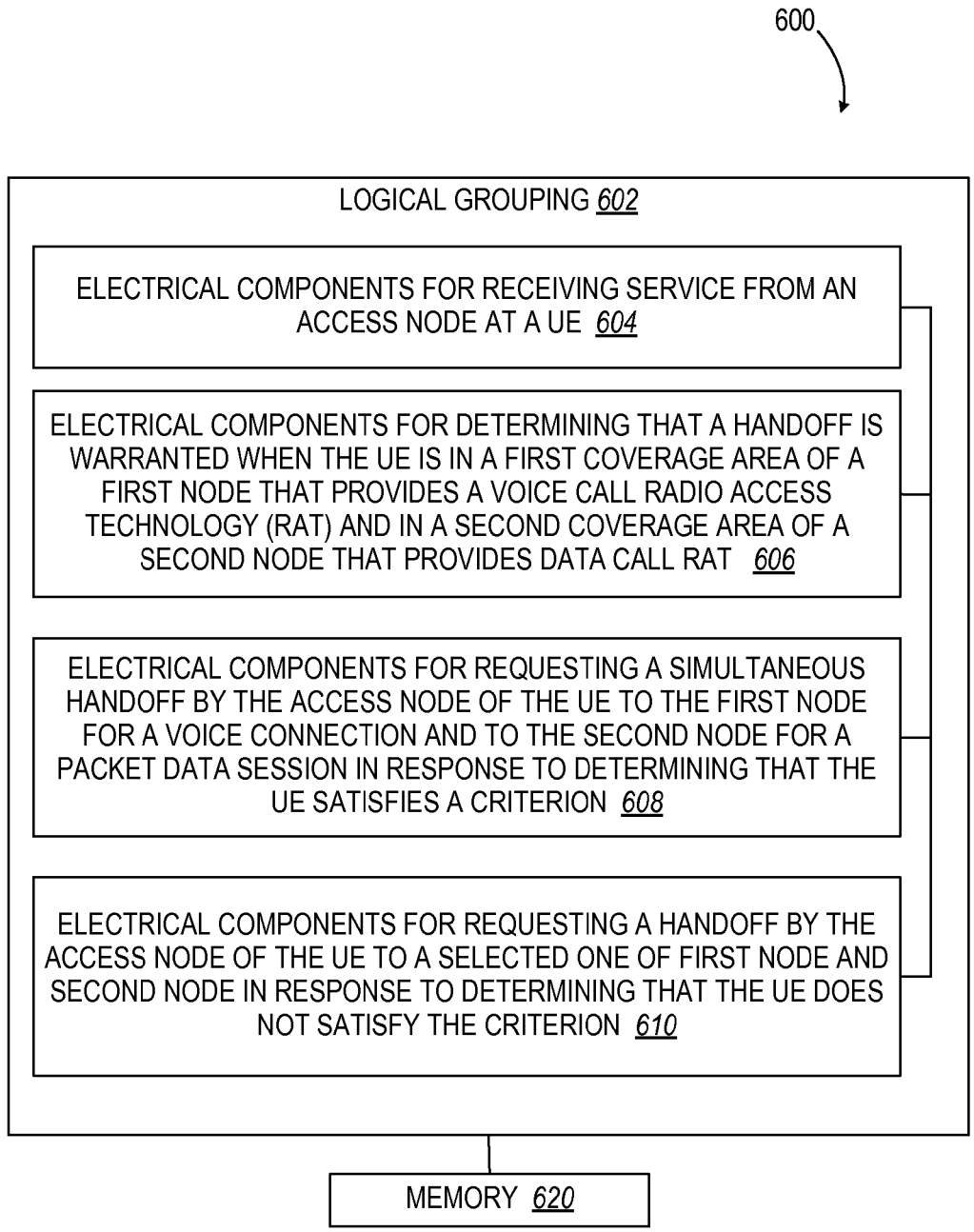
FIG. 6 illustrates a schematic diagram of a system for performing a handoff of a UE.

With reference to FIG. 6, illustrated is a system 600 for performing a handoff of a UE. For example, system 600 can reside at least partially within a network entity. It is to be appreciated that system 600 is represented as including functional blocks, which can be functional blocks that represent functions implemented by a computing platform, processor, software, or combination thereof (e.g., firmware). System 600 includes a logical grouping 602 of electrical components that can act in conjunction. For instance, logical grouping 602 can include an electrical component 604 for serving a UE via an access node. Moreover, logical grouping 602 can include an electrical component 606 for determining that a handoff is warranted when the UE is in a first coverage area of a first node that provides a voice call Radio Access Technology (RAT) and in a second coverage area of a second node that provides data call RAT. For another instance, logical grouping 602 can include an electrical component 608 for requesting a simultaneous handoff by the access node of the UE to the first node for a voice connection and to the second node for a packet data session in response to determining that the UE satisfies a criterion. For an additional instance, logical grouping 602 can include an electrical component 610 for requesting a handoff by the access node of the UE to a selected one of the first node or the second node in response to determining that the UE does not satisfy the criterion. Additionally, system 600 can include a memory 620 that retains instructions for executing functions associated with electrical components 604-608. While shown as being external to memory 620, it is to be understood that one or more of electrical components 604-608 can exist within memory 620.

Figure 7:
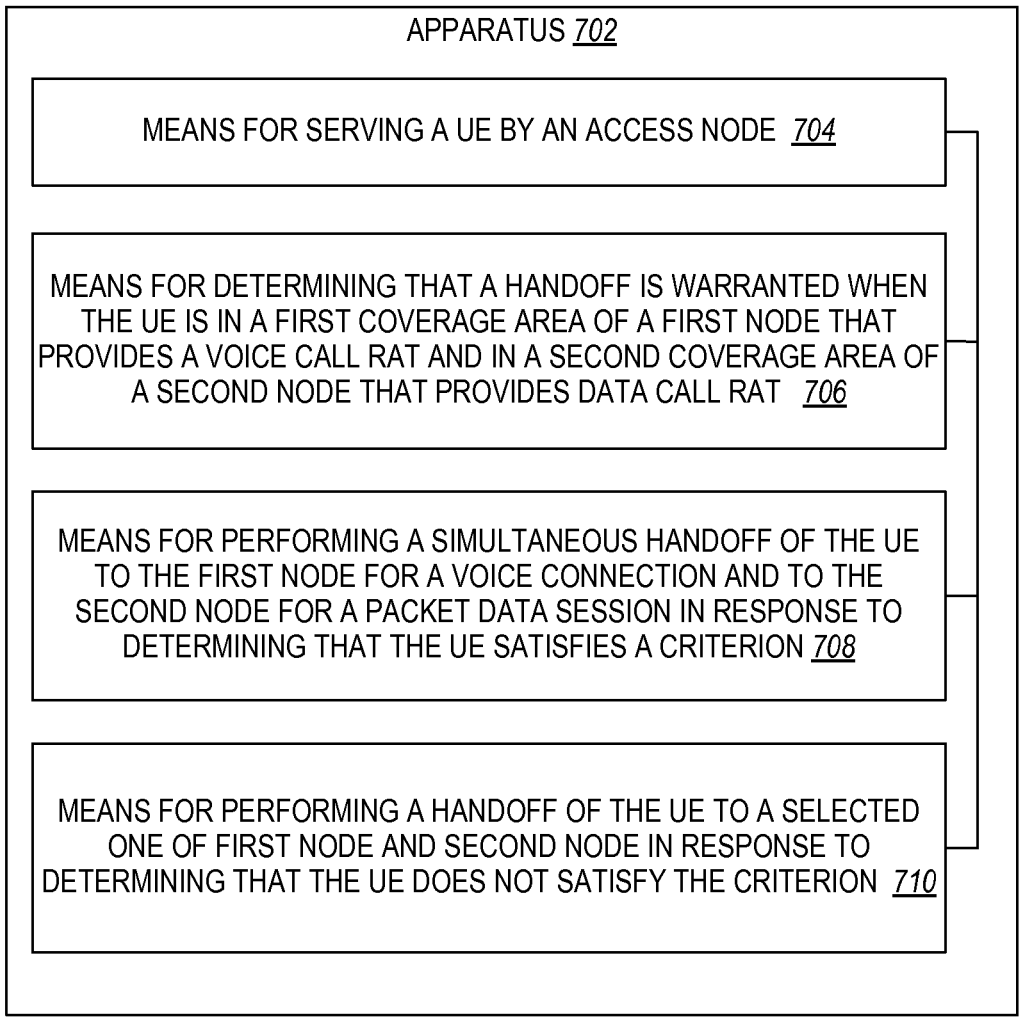
FIG. 7 illustrates a schematic diagram of an apparatus having means for performing a handoff of a UE.

In FIG. 7, an apparatus 702 is depicted for performing a handoff of a UE. Means 704 are provided for serving a UE via an access node. Means 706 are provided for determining that a handoff is warranted when the UE is in a first coverage area of a first node that provides a voice call RAT and in a second coverage area of a second node that provides data call RAT. Means 708 are provided for performing a simultaneous handoff of the UE to the first node for a voice connection and to the second node for a packet data session in response to determining that the UE satisfies a criterion. Means 710 are provided for performing a handoff of the UE to a selected one of the first node or the second node in response to determining that the UE does not satisfy the criterion In FIG. 8, an apparatus 802 is depicted for performing a handoff of a UE. Means 804 are provided for receiving service from an access node at a UE. Means 806 are provided for determining that a handoff is warranted when the UE is in a first coverage area of a first node that provides a voice call Radio Access Technology (RAT) and in a second coverage area of a second node that provides data call RAT. Means 808 are provided for requesting a simultaneous handoff by the access node of the UE to the first node for a voice connection and to the second node for a packet data session in response to determining that the UE satisfies a criterion. Means 810 are provided for requesting a handoff by the access node of the UE to a selected one of the first node or the second node in response to determining that the UE does not satisfy the criterion.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 9:
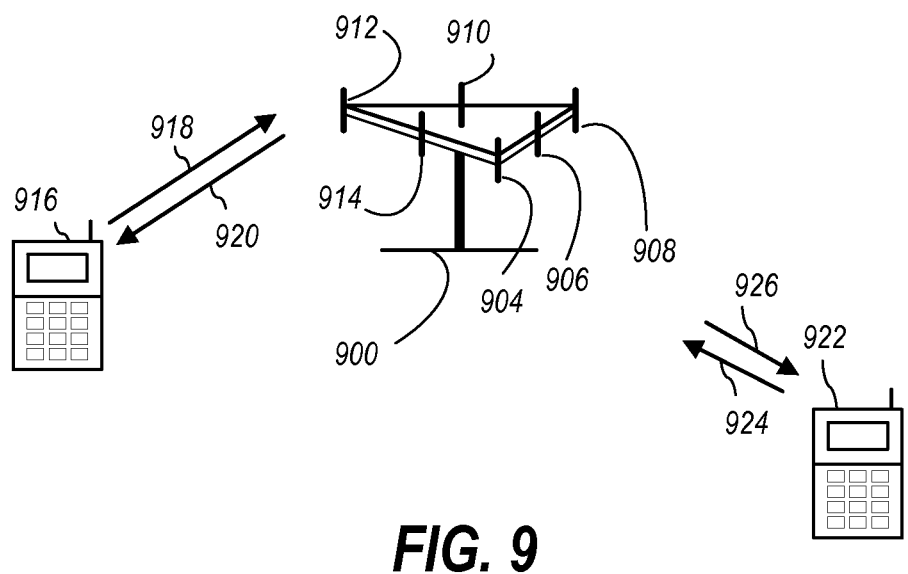
FIG. 9 illustrates a schematic diagram of a multiple access wireless communication system.

Referring to FIG. 9, a multiple access wireless communication system according to one aspect is illustrated. An access point (AP) 900 includes multiple antenna groups, one including 904 and 906, another including 908 and 910, and an additional including 912 and 914. In FIG. 9, only two antennas are shown for each antenna group, however, more or fewer antennas may be utilized for each antenna group. Access terminal (AT) 916 is in communication with antennas 912 and 914, where antennas 912 and 914 transmit information to access terminal 916 over forward link 920 and receive information from access terminal 916 over reverse link 918. Access terminal 922 is in communication with antennas 906 and 908, where antennas 906 and 908 transmit information to access terminal 922 over forward link 926 and receive information from access terminal 922 over reverse link 924. In a Frequency Division Duplex (FDD) system, communication links 918, 920, 924 and 926 may use different frequencies for communication. For example, forward link 920 may use a different frequency then that used by reverse link 918.

Each group of antennas and/or the area in which they are designed to communicate is often referred to as a sector of the access point 900. In the aspect, antenna groups each are designed to communicate to access terminals 916 and 922 in a sector of the areas covered by access point 900.

In communication over forward links 920 and 926, the transmitting antennas of access point 900 utilize beamforming in order to improve the signal-to-noise ratio of forward links for the different access terminals 916 and 922. Also, an access point using beamforming to transmit to access terminals scattered randomly through its coverage causes less interference to access terminals in neighboring cells than an access point transmitting through a single antenna to all of its access terminals.

An access point 900 may be a fixed station used for communicating with the terminals and may also be referred to as an access point, a Node B, or some other terminology. An access terminal 916 and 922 may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
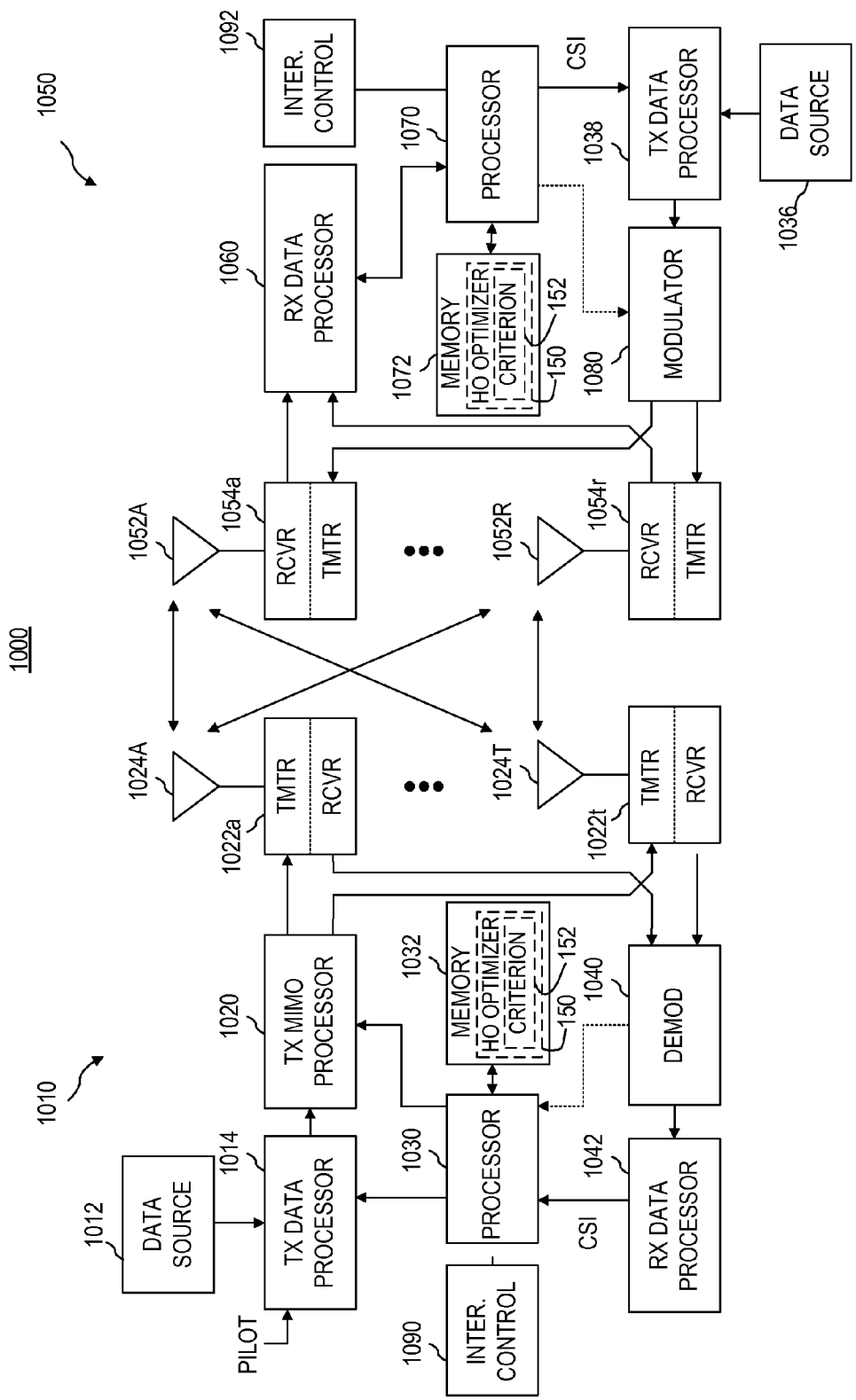
FIG. 10 illustrates a schematic diagram of two nodes for multiple input multiple output wireless communication.

The teachings herein may be incorporated into a node (e.g., a device) employing various components for communicating with at least one other node. FIG. 10 depicts several sample components that may be employed to facilitate communication between nodes. Specifically, FIG. 10 illustrates a wireless device 1010 (e.g., an access point) and a wireless device 1050 (e.g., an access terminal) of a MIMO system 1000. At the device 1010, traffic data for a number of data streams is provided from a data source 1012 to a transmit ("TX") data processor 1014.

In some aspects, each data stream is transmitted over a respective transmit antenna. The TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers ("XCVR") 1022*a*-1022*t* that each has a transmitter (TMTR) and receiver (RCVR). In some aspects, the TX MIMO processor 1020 applies beam-forming weights to the symbols of the data streams and to the antenna from which the symbol is being transmitted.

Each transceiver 1022*a*-1022*t* receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $1022a$-$1022t$ are then transmitted from $N_T$ antennas $1024a$-$1024t$, respectively.

At the device 1050, the transmitted modulated signals are received by $N_R$ antennas $1052a$-$1052r$ and the received signal from each antenna $1052a$-$1052r$ is provided to a respective transceiver ("XCVR") $1054a$-$1054r$. Each transceiver $1054a$-$1054r$ conditions (e.g., filters, amplifies, and downconverts) a respective received signal, digitizes the conditioned signal to provide samples, and further processes the samples to provide a corresponding "received" symbol stream.

A receive ("RX") data processor 1060 then receives and processes the $N_R$ received symbol streams from $N_R$ transceivers $1054a$-$1054r$ based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use. The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers $1054a$-$1054r$, and transmitted back to the device 1010.

At the device 1010, the modulated signals from the device 1050 are received by the antennas $1024a$-$1024t$, conditioned by the transceivers $1022a$-$1022t$, demodulated by a demodulator ("DEMOD") 1040, and processed by a RX data processor 1042 to extract the reverse link message transmitted by the device 1050. The processor 1030 then determines which precoding matrix to use for determining the beam-forming weights then processes the extracted message.

FIG. 10 also illustrates that the communication components may include one or more components that perform interference control operations. For example, an interference ("INTER.") control component 1090 may cooperate with the processor 1030 and/or other components of the device 1010 to send/receive signals to/from another device (e.g., device 1050). Similarly, an interference control component 1092 may cooperate with the processor 1070 and/or other components of the device 1050 to send/receive signals to/from another device (e.g., device 1010). It should be appreciated that for each device 1010 and 1050 the functionality of two or more of the described components may be provided by a single component. For example, a single processing component may provide the functionality of the interference control component 1090 and the processor 1030 and a single processing component may provide the functionality of the interference control component 1092 and the processor 1070.

Figure 11:
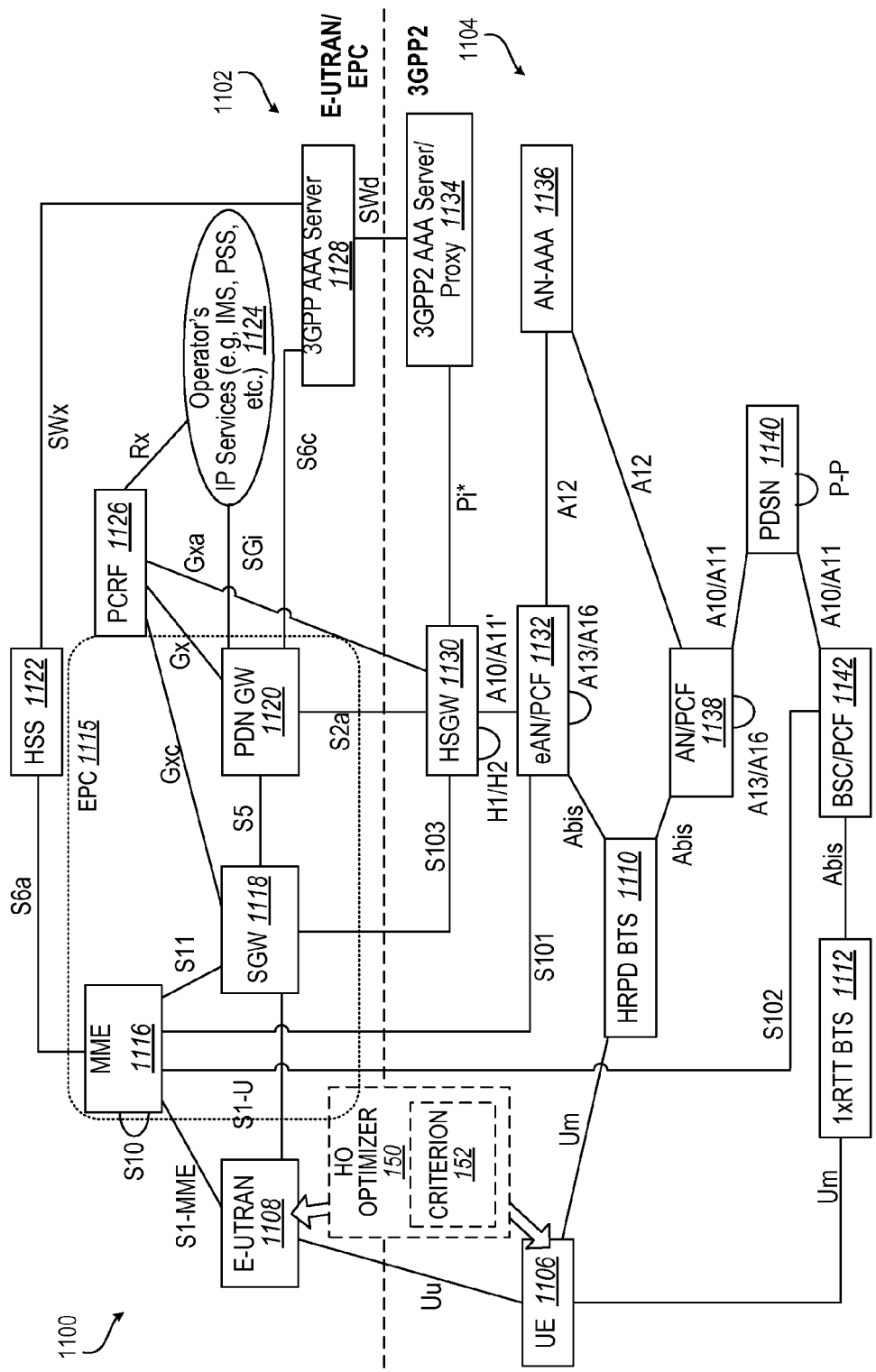
FIG. 11 illustrates a schematic diagram of a wireless communication system configured to support a number of users.

In FIG. 11, a communication system 1100 is depicted with an Evolved Universal Terrestrial Radio Access Network (E-UTRAN)/Evolved Packet Core (EPC) 1102 (i.e., GSM (Global System for Mobile Communications) or WCDMA (Wideband Code Division Multiple Access)) and a 3GPP2 network 1104 for providing coverage to a mobile device, depicted as UE 1106. The 3rd Generation Partnership Project 2 (3GPP2) is a collaboration between telecommunications associations to make a globally applicable third generation (3G) mobile phone system specification within the scope of the ITU's IMT-2000 project. In practice, 3GPP2 is the standardization group for CDMA2000, the set of 3G standards based on earlier 2G CDMA technology. 3GPP2 should not be confused with 3GPP, which specifies standards for another 3G technology known as Universal Mobile Telecommunications System (UMTS).

The LTE technology is a revolutionary upgrade of 3G systems including WCDMA and CDMA2000. The evolution path from 2G/3G systems to LTE is basically by realizing interworking and seamless handover between systems to migrate the existing network at a low cost. System Architecture Evolution (aka SAE) is the core network architecture of 3GPP's LTE wireless communication standard. SAE is the evolution of the General Packet Radio Service (GPRS) Core Network, with some differences: (1) simplified architecture; (2) All Internet Protocol Network (AIPN); and (3) support for higher throughput and lower latency radio access networks (RANs) support for, and mobility between, multiple heterogeneous RANs, including legacy systems as GPRS, but also non-3GPP systems (say WiMAX).

The evolved RAN for LTE consists of a single node, i.e., an evolved Base Node ("eNodeB" or "eNB") that interfaces with a UE 1106. The eNB is depicted as an E-UTRAN 1108 for the E-UTRAN/EPC 1102. The eNB hosts the PHYsical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated Uplink (UL) Quality of Service (QoS), cell information broadcast, ciphering/deciphering of user and control plane data, and compression/decompression of Downlink/Uplink (DL/UL) user plane packet headers.

Overall, three different Radio Access Technologies (RATs) are depicted for radio access to the UE 1106. The E-UTRAN 1108 has a Uu external radio interface (logical interface) to the UE 1106. On the 3GPP2 network 1104, both a HRPD Base Transceiver System (BTS) 1110 and a 1×RTT (Radio Transmission Technology) BTS 1112 can have a Um external radio interface to the UE 1106. Examples are Uu or Um to the UE 1106 for 3GPP systems and Um for 3GPP2 systems (i.e., CDMA). The external interface to the UE 1106 transports user data and signaling data over an air interface 1114.

The main component of the SAE architecture is the EPC 1115, also known as SAE Core. The EPC 1115 serves as equivalent of GPRS networks via subcomponents of a Mobility Management Entity (MME) 1116, Serving Gateway (SGW) 1118 and PDN Gateway (PGW) 1120.

The MME 1116 is the key control-node for the LTE access-network, depicted as the E-UTRAN 1108. It is responsible for idle mode UE tracking and paging procedure including retransmissions. It is involved in the bearer activation/deactivation process and is also responsible for choosing the SGW 1118 for a UE 1106 at the initial attach and at time of intra-LTE handover involving Core Network (CN) node relocation. It is responsible for authenticating the user (by interacting with the Home Subscriber Server (HSS)). The Non-Access Stratum (NAS) signaling terminates at the MME 1116 and it is also responsible for generation and allocation of temporary identities to UEs 1106. It checks the authorization of the UE 1106 to camp on the service provider's Public Land Mobile Network (PLMN) and enforces UE roaming restrictions. The MME 1116 is the termination point in the network for ciphering/integrity protection for NAS signaling and handles the security key management. Lawful interception of signaling is also supported by the MME 1116. The MME 1116 also provides the control plane function for mobility between LTE and 2G/3G access networks with the S3 interface terminating at the MME 1116 from the Serving GPRS Support Node (SGSN) (not depicted). The MME 1116 also terminates the S6a interface towards the Home Subscriber Server (HSS) 1122 for roaming UEs.

The SGW 1118 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs 1106, the SGW 1118 terminates the Downlink (DL) data path and triggers paging when DL data arrives for the UE 1106. It manages and stores UE contexts, e.g., parameters of the Internet Protocol (IP) bearer service, network internal routing information. It also performs replication of the user traffic in case of lawful interception.

The PGW 1120 provides connectivity from the UE 1106 to external packet data networks, depicted as Operator's IP Services 1124, such as IP Multimedia Subsystem (IMS), Packet Switched Services (PSS) etc., by being the point of exit and entry of traffic for the UE 1106. A UE 1106 may have simultaneous connectivity with more than one PGW 1120 for accessing multiple PDNs. The PGW 1120 performs policy enforcement, packet filtering for each user, charging support, lawful Interception and packet screening. Another key role of the PGW 1120 is to act as the anchor for mobility between 3GPP and non-3GPP technologies such as WiMAX and 3GPP2 (CDMA 1× and EvDO).

A key feature of the Evolved Packet System (EPS), otherwise referred herein as 3GPP Long Term Evolution (LTE), is the separation of the network entity that performs control-plane functionality (MME 1116) from the network entity that performs bearer-plane functionality (SGW 1118) with a well defined open interface between them (S11). Since E-UTRAN 1108 provides higher bandwidths to enable new services as well as to improve existing ones, separation of MME 1116 from SGW 1118 implies that SGW 1118 can be based on a platform optimized for high bandwidth packet processing, whereas the MME 1116 is based on a platform optimized for signaling transactions. This enables selection of more cost-effective platforms for, as well as independent scaling of, each of these two elements. Service providers can also choose optimized topological locations of SGWs 1118 within the network independent of the locations of MMEs 1116 in order to optimize bandwidth reduce latencies and avoid concentrated points of failure.

An Application Function (AF) is an element offering applications that require the Policy and Charging Control of traffic plane resources (e.g., UMTS Packet Switched (PS) domain/GPRS domain resources). The AF is depicted as an operator's IP services 1124. One example of an application function is Policy Control and Charging Rules Function (PCRF) 1126. The AF can use the Rx reference point to provide session information to the PCRF 1126. The PCRF 1126 is a functional element that encompasses policy control decision and flow based charging control functionalities. The PCRF 1126 provides network control regarding the service data flow detection, gating, QoS and flow based charging (except credit management) towards the Policy and Charging Enforcement Function (PCEF) (not shown). The PCRF receives session and media related information from the AF and informs AF of traffic plane events. The PCRF 1126 may check that the service information provided by the AF is consistent with the operator defined policy rules before storing the service information. The service information shall be used to derive the QoS for the service. The PCRF 1126 may reject the request received from the AF and as a result the PCRF 1126 indicates, in the response to the AF, the service information that can be accepted by the PCRF 1126. The PCRF 1126 may use the subscription information as basis for the policy and charging control decisions. The subscription information may apply for both session based and non-session based services. The subscription specific information for each service may contain e.g. max QoS class and max bit rate. If the AF requests it, the PCRF 1126 reports IP-CAN (Internet Protocol Connectivity Access Network) session events (including bearer events and events on AF signaling transport) to the AF via the Rx reference point.

A 3GPP Authentication, Authorization, Accounting (AAA) server 1128 is interfaced via an S6c to the PGW 1120 and an SWx interface to the HSS 1122.

S1-MME is the reference point for the control plane protocol between E-UTRAN 1108 and MME 1116. The protocol over this reference point is evolved Radio Access Network Application Protocol (eRANAP) and it uses Stream Control Transmission Protocol (SCTP) as the transport protocol.

S1-U reference point between E-UTRAN 1108 and SGW 1118 for the per-bearer user plane tunneling and inter-eNB path switching during handover. The transport protocol over this interface is GPRS Tunneling Protocol-User plane (GTP-U).

S2a provides the user plane with related control and mobility support between trusted non-3GPP IP access and the SGW 1118. S2a is based on Proxy Mobile Internet Protocol (PMIP). To enable access via trusted non-3GPP IP accesses that do not support PMIP, S2a also supports Client Mobile Internet Protocol version 4 (IPv4) Foreign Agent (FA) mode.

S2b provides the user plane with related control and mobility support between evolved Packet Data Gateway (ePDG) and the PDN GW. It is based on PMIP.

S2c provides the user plane with related control and mobility support between UE and the PDN GW. This reference point is implemented over trusted and/or untrusted non-3GPP Access and/or 3GPP access. This protocol is based on Client Mobile IP co-located mode.

S3 is the interface between SGSN (not shown) and MME 1116 and it enables user and bearer information exchange for inter 3GPP access network mobility in idle or active state. It is based on Gn reference point as defined between SGSNs.

S4 provides the user plane with related control and mobility support between SGSN and the SGW 1118 and is based on Gn reference point as defined between SGSN and Gateway GPRS Support Node (GGSN) (not shown).

S5 provides user plane tunneling and tunnel management between SGW 1118 and PGW 1120. It is used for SGW relocation due to UE mobility and if the SGW needs to connect to a non-collocated PDN GW for the required PDN connectivity.

S6a enables transfer of subscription and authentication data for authenticating/authorizing user access to the evolved system (AAA interface) between MME 1116 and HSS 1122.

S7 provides transfer of (QoS) policy and charging rules from Policy and Charging Rules Function (PCRF) 1126 to Policy and Charging Enforcement Function (PCEF) in the PGW 1120. This interface is based on the Gx interface.

S10 is the reference point between MMEs 1116 for MME relocation and MME to MME information transfer.

S11 is the reference point between MME 1116 and SGW 1118.

SGi is the reference point between the PGW 1120 and the packet data network 1128.

Packet data network (PDN) 1128 may be an operator-external public or private packet data network or an intra-operator packet data network, e.g. for provision of IMS services. This reference point corresponds to Gi for 2G/3G accesses Rx+. The Rx reference point resides between the Application Function and the PCRF 1126.

The 3GPP2 network 1104 is depicted as including a HSGW 1130, evolved HRPD Access Network/Packet Control Function (eAN/PCF) 1132, 3GPP2 AAA server/proxy 1134, Access Node (AN)-AAA 1136, AN/PCF 1138, Packet Data Serving Node (PDSN) 1140, and Base Station Controller (BSC)/PCF 1142 in addition to the HRPD BTS 1110 and 1×RTT BTS 1112.

In the architecture, several new interfaces including S101, S103 and S2a are introduced to realize the interworking between CDMA2000 HRPD and LTE. Corresponding to the system architecture of LTE, Packet Data Serving Node (PDSN) is split into the HSGW 1130 and PGW 1120 while Access Network/Packet Control Function (AN/PCF) 1138 is enhanced into eAN/PCF 1132 to support the three new interfaces. HRPD here is called evolved HRPD (eHRPD).

The E-UTRAN and the 3GPP2 eHRPD network architecture includes the following interfaces:

S101 reference point provides for the signaling interface between the MME 1116 in the 3GPP EPC 1115 and the eAN/PCF 1132 in the 3GPP2 eHRPD 1104. This S101 reference point provides tunneling of signaling and data between the UE 1106 and the target access network via the source/serving access network. This allows a UE 1106 to tunnel HRPD air interface signaling over the LTE system to make pre-registration and exchange handover signaling messages with the target system before the actual handover, thus realizing a seamless and rapid handover between two systems.

S103 reference point is the bearer interface between the EPC Serving Gateway (SGW) 1118 and the HSGW 1130, which is used to forward the downlink data, minimizing the packet loss during the transfer from LTE to HRPD. The S103 reference point connects the PGW 1120 in the 3GPP EPC 1115 to the HSGW 1130 in the 3GPP2 eHRPD network 1104.

For the interworking between E-UTRAN/EPC 1102 and 3GPP2 eHRPD network 1104, the following reference points are defined:

The H1 reference point carries signaling information between a source HSGW (S-HSGW) and a target HSGW (T-HSGW) for optimized inter-HSGW handoff.

The H2 reference point carries user traffic between a source HSGW (S-HSGW) and a target HSGW (T-HSGW) for optimized inter-HSGW handoff.

The Gxa reference point connects the PCRF 1126 in the 3GPP EPC 1102 to Bearer Binding and Event Reporting Function (BBERF) in the HSGW 1130 in the 3GPP2 eHRPD network 1104.

The Pi* reference point connects the HSGW 1130 to the 3GPP2 AAA server/proxy 1134.

The S2a reference point connects the PGW 1120 in the 3GPP EPC 1115 to the HSGW 1130 in the 3GPP2 eHRPD network 1104. This reference point provides the user plane with related control and mobility support between eHRPD network 1104 and the PGW 1120. S2a provides the user plane with related control and mobility support between trusted non-3GPP IP access (e.g., WiMAX access network) and the 3GPP core network (PGW 1120). It is defined between the Mobile Access Gateway and Packet Data Gateway. In the case that the Mobile IPv4 is used as S2a protocol, then the WiMAX side of this reference point is terminated by the MIPv4 Foreign Agent function.

S6b is the reference point between PGW 1120 and 3GPP AAA server/proxy 1134 for mobility related authentication if needed. S6b may also be used to retrieve and request storage of mobility parameters. This reference point may also be used to retrieve static QoS profile for a UE for non-3GPP access in case dynamic Policy and Charging Control (PCC) is not supported. Gx provides transfer of QoS policy and charging rules from PCRF 1126 to Policy and Charging Enforcement Function (PCEF) in the PGW 1120. Gxa provides transfer of QoS policy information from PCRF 1126 to the trusted non-3GPP accesses (e.g., Access Service Network (ASN) Gateway (GW)). Gxc provides transfer of QoS policy information from PCRF 1126 to the SGW 1118.

AN-AAA 1136 communicates with the Radio Network Controller (RNC) (not shown) in the Access Network (AN) to enable authentication and authorization functions to be performed at the AN 1132, 1138. The interface between AN 1132, 1138 and AN-AAA 1136 is known as the A12 interface.

HSGW 1130 provides interconnection between UE 1106 and the 3GPP EPS architecture, including seamless mobility, Policy and Charging Control (PCC) and roaming between LTE and HRPD. The HSGW 1130 is the entity that terminates the eHRPD access network interface from the eAN/PCF 1132 (i.e., A10/A11 interfaces). The HSGW 1130 routes UE originated or UE terminated packet data traffic. An HSGW 1130 also establishes, maintains and terminates link layer sessions to UEs 1106. The HSGW functionality provides interworking of the UE 1106 with the 3GPP EPS architecture and protocols. This includes support for mobility, policy control and charging (PCC), access authentication, and roaming. The HSGW 1130 supports inter-HSGW handoff as well, using S2a (Proxy Mobile Internet Protocol version 6 (PMIPv6))). The HSGW 1130 supports inter-HSGW handoff with context transfer. The HSGW 1130 may use inter-HSGW handoff without context transfer.

The eAN/PCF 1132 supports the tunneling of HRPD air interface signaling through S101. The enhanced AN/PCF solution adds a Signaling Adaptation Protocol (SAP) in the connection layer.

A10/A11 interface bear the transmission of signaling and data between PCF and PDSN 1140 for maintaining the Base Station System-Base Station Controller (BSS-BCF) A10 connection. The A10 interface bears data while A11 interface bears signaling.

Abis interface uses Abis protocol for interfaces between the BSC (not shown) and the BTS 1110, 1112. It consists of two parts on the application layer: control part (Abisc) and traffic part (Abist), the former converts the Um interface control channel signaling and the latter converts the control over the traffic channel.

Either or both of the UE 1106 and E-UTRAN 1108 can incorporate and implement the HO Optimization Component 150 and criterion 152.

Variations, modification, and other implementations of what is described herein will occur to those of ordinary skill in the art without departing from the spirit and scope of the disclosure as claimed. Accordingly, the disclosure is to be defined not by the preceding illustrative description but instead by the spirit and scope of the following claims.

What is claimed is:

1. A method for performing a handoff of a User Equipment (UE), comprising:
serving the UE via an access node;
determining that a handoff is warranted when the UE is in a first coverage area of a first node that provides a voice call Radio Access Technology (RAT) and in a second coverage area of a second node that provides a data call RAT;
evaluating whether the UE has an active data session with the access node to determine whether to perform a simultaneous handoff to the first node and the second node that provide different RATs;
performing the simultaneous handoff of the UE to the first node for a voice connection and to the second node for a packet data session in response to determining that the UE has the active data session with the access node; and
performing a handoff of the UE to a selected one of the first node or the second node in response to determining that the UE does not have the active data session with the access node.

2. The method of claim 1, wherein serving the UE by the access node further comprises using a Long Term Evolution (LTE) RAT,
wherein the first node provides the voice call RAT comprising 1×RTT and the second node provides the data call RAT comprising 1×EVDO.

3. The method of claim 1, further comprising determining that the UE has requested simultaneous handoff to further determine whether to perform the simultaneous handoff to the first node and the second node.

4. The method of claim 1, further comprising determining an extent of subscriber rights attributed to the UE to further determine whether to perform the simultaneous handoff to the first node and the second node.

5. The method of claim 1, further comprising determining a network traffic condition to further determine whether to perform the simultaneous handoff to the first node and the second node.

6. The method of claim 1, further comprising determining that the UE has a second receiver to further determine whether to perform the simultaneous handoff to the first node and the second node.

7. The method of claim 1, further comprising determining a status of data packet carrying queues to further determine whether to perform the simultaneous handoff to the first node and the second node.

8. At least one processor for performing a handoff of a User Equipment (UE), comprising:
a first module for serving the UE via an access node;
a second module for determining that a handoff is warranted when the UE is in a first coverage area of a first node that provides a voice call Radio Access Technology (RAT) and in a second coverage area of a second node that provides a data call RAT;
a third module for evaluating whether the UE has an active data session with the access node to determine whether to perform a simultaneous handoff to the first node and the second node that provide different RATs;
a fourth module for performing the simultaneous handoff of the UE to the first node for a voice connection and to the second node for a packet data session in response to determining that the UE has the active data session with the access node; and
a fifth module for performing a handoff of the UE to a selected one of the first node or the second node in response to determining that the UE does not have the active data session with the access node.

9. A computer program product for performing a handoff of a User Equipment (UE), comprising:
a non-transitory computer-readable medium storing sets of code comprising:
a first set of codes for causing a computer to serve the UE via an access node;
a second set of codes for causing the computer to determine that a handoff is warranted when the UE is in a first coverage area of a first node that provides a voice call Radio Access Technology (RAT) and in a second coverage area of a second node that provides a data call RAT;
a third set of codes for causing the computer to evaluate whether the UE has an active data session with the access node to determine whether to perform a simultaneous handoff to the first node and the second node that provide different RATs;
a fourth set of codes for causing the computer to perform the simultaneous handoff of the UE to the first node for a voice connection and to the second node for a packet data session in response to determining that the UE has the active data session with the access node; and
a fifth set of codes for causing the computer to perform a handoff of the UE to a selected one of the first node or the second node in response to determining that the UE does not have the active data session with the access node.

10. An apparatus for performing a handoff of a User Equipment (UE), comprising:
means for serving the UE via an access node;
means for determining that a handoff is warranted when the UE is in a first coverage area of a first node that provides a voice call Radio Access Technology (RAT) and in a second coverage area of a second node that provides a data call RAT;
means for evaluating whether the UE has an active data session with the access node to determine whether to perform a simultaneous handoff to the first node and the second node that provide different RATs;
means for performing the simultaneous handoff of the UE to the first node for a voice connection and to the second node for a packet data session in response to determining that the UE has the active data session with the access node; and
means for performing a handoff of the UE to a selected one of the first node or the second node in response to determining that the UE does not have the active data session with the access node.

11. An apparatus for performing a handoff of a User Equipment (UE), comprising:
a transceiver for serving the UE via an access node;
a computing platform for determining that a handoff is warranted when the UE is in a first coverage area of a first node that provides a voice call Radio Access Technology (RAT) and in a second coverage area of a second node that provides a data call RAT;
the computer platform further for evaluating whether the UE has an active data session with the access node to determine whether to perform a simultaneous handoff to the first node and the second node that provide different RATs;
network interface for performing the simultaneous handoff of the UE to the first node for a voice connection and to the second node for a packet data session in response to determining that the UE has the active data session with the access node; and the network interface further for performing a handoff of the UE to a selected one of the first node or the second node in response to determining that the UE does not have the active data session with the access node.

12. The apparatus of claim 11, wherein the transceiver is further for serving the UE by the access node by using a Long Term Evolution (LTE) RAT, wherein the first node provides the voice call RAT comprising 1×RTT and the second node provides the data call RAT comprising 1×EVDO.

13. The apparatus of claim 11, wherein the computing platform is further for determining that the UE has an ongoing packet data communications to further determine whether to perform the simultaneous handoff to the first node and the second node.

14. The apparatus of claim 11, wherein the computing platform is further for determining that the UE has requested simultaneous handoff to further determine whether to perform the simultaneous handoff to the first node and the second node.

15. The apparatus of claim 11, wherein the computing platform is further for determining an extent of subscriber rights attributed to the UE to further determine whether to perform the simultaneous handoff to the first node and the second node.

16. The apparatus of claim 11, wherein the computing platform is further for determining a network traffic condition to further determine whether to perform the simultaneous handoff to the first node and the second node.

17. The apparatus of claim 11, wherein the computing platform is further for determining that the UE has a second receiver to further determine whether to perform the simultaneous handoff to the first node and the second node.

18. A method for performing a handoff of a User Equipment (UE), comprising:

receiving service from an access node at the UE using an initial radio access technology (RAT);

pre-registering with a second node that provides a data call RAT different from the initial RAT over signaling with the access node; and performing simultaneous handoff by the access node of the UE to a first node providing a voice call RAT different from the initial RAT for a voice connection and to the second node for a packet data session following the pre-registering with the second node.

19. The method of claim 18, wherein the access node provides the initial RAT comprising a Long Term Evolution (LTE) RAT, wherein the first node provides the voice call RAT comprising 1×RTT and the second node provides the data call RAT comprising 1×EVDO.

20. The method of claim 18, wherein the pre-registering with the second node comprises exchanging handover signaling messages with the second node.

21. The method of claim 18, further comprising indicating to the access node that the simultaneous handoff is warranted.

22. The method of claim 21, wherein indicating the simultaneous handover is warranted is based at least in part on evaluating the criterion further comprises determining a status of data packet carrying queues.

23. The method of claim 21, wherein indicating the simultaneous handover is warranted is based at least in part on accessing a parameter setting of an application program interface that indicates a time critical application.

24. The method of claim 21, wherein indicating the simultaneous handover is warranted is based at least in part on determining an extent of subscriber rights.

25. The method of claim 21, wherein indicating the simultaneous handover is warranted is based at least in part on determining a network traffic condition.

26. The method of claim 21, wherein indicating the simultaneous handover is warranted is based at least in part on determining that the UE has a second receiver.

27. At least one processor for performing a handoff of a User Equipment (UE), comprising:

a first module for receiving service from an access node at the UE using an initial radio access technology (RAT);

a second module for pre-registering with a second node that provides a data call RAT different from the initial RAT over signaling with the access node; and a third module for performing simultaneous handoff by the access node of the UE to a first node providing a voice call RAT different from the initial RAT for a voice connection and to the second node for a packet data session following the pre-registering with the second node.

28. A computer program product for performing a handoff of a User Equipment (UE), comprising:

a non-transitory computer-readable medium storing sets of codes:

a first set of codes for causing a computer to receive service from an access node at the UE using an initial radio access technology (RAT);

a second set of codes for causing the computer to pre-register with a second node that provides a data call RAT different from the initial RAT over signaling with the access node; and a third set of codes for causing the computer to perform simultaneous handoff by the access node of the UE to a first node providing a voice call RAT different from the initial RAT for a voice connection and to the second node for a packet data session following the pre-registering with the second node.

29. An apparatus for performing a handoff of a User Equipment (UE), comprising:

means for receiving service from an access node at the UE using an initial radio access technology (RAT);

means for pre-registering with a second node that provides a data call RAT different from the initial RAT over signaling with the access node; and means for performing simultaneous handoff by the access node of the UE to a first node providing a voice call RAT different from the initial RAT for a voice connection and to the second node for a packet data session following the pre-registering with the second node.

30. An apparatus for performing a handoff of a User Equipment (UE), comprising:

a transceiver for receiving service from an access node at the UE using an initial radio access technology (RAT);

a computing platform for pre-registering with a second node that provides a data call RAT different from the initial RAT over signaling with the access node and performing simultaneous handoff by the access node of the UE to a first node providing a voice call RAT different from the initial RAT for a voice connection and to the second node for a packet data session following the pre-registering with the second node.

31. The apparatus of claim 30, wherein the transceiver is further for receiving service from the access node by using the initial RAT comprising a Long Term Evolution (LTE) RAT, wherein the first node provides the voice call RAT comprising 1×RTT and the second node provides the data call RAT comprising 1×EVDO.

32. The apparatus of claim 30, wherein the computing platform is further for pre-registering with the second node at least in part by exchanging handover signaling messages with the second node.

33. The apparatus of claim 30, wherein the computing platform is further for further comprising indicating to the access node that the simultaneous handoff is warranted.

34. The apparatus of claim 33, wherein the computing platform is further for indicating the simultaneous handover is warranted based at least in part on accessing the preference for simultaneous handoff by accessing a parameter setting of an application program interface that indicates a time critical application.

35. The apparatus of claim 33, wherein the computing platform is further for indicating the simultaneous handover is warranted based at least in part on determining whether the criterion is satisfied by determining an extent of subscriber rights.

36. The apparatus of claim 33, wherein the computing platform is further for indicating the simultaneous handover is warranted based at least in part on determining whether the criterion is satisfied by determining a network traffic condition.

37. The apparatus of claim 33, wherein the computing platform is further for indicating the simultaneous handover is warranted based at least in part on determining whether the criterion is satisfied by determining that the UE has a second receiver.

* * * * *